(12) United States Patent
Park et al.

(10) Patent No.: US 11,923,540 B2
(45) Date of Patent: Mar. 5, 2024

(54) LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

(71) Applicant: SK On Co., Ltd., Seoul (KR)

(72) Inventors: Eunjun Park, Daejeon (KR); Joon-Sup Kim, Daejeon (KR); Gwi Ok Park, Daejeon (KR); Hansu Kim, Seoul (KR); Donghan Youn, Namyangju-si (KR); Dong Jae Chung, Seoul (KR)

(73) Assignee: SK On Co., Ltd., Seoul (KR)

( * ) Notice: Subject to any disclaimer, the term of this patent is extended or adjusted under 35 U.S.C. 154(b) by 90 days.

(21) Appl. No.: 17/383,619

(22) Filed: Jul. 23, 2021

(65) Prior Publication Data

US 2022/0037656 A1 Feb. 3, 2022

(30) Foreign Application Priority Data

Jul. 29, 2020 (KR) ........................ 10-2020-0094454

(51) Int. Cl.
*H01M 4/48* (2010.01)
*H01M 4/04* (2006.01)
(Continued)

(52) U.S. Cl.
CPC ......... *H01M 4/483* (2013.01); *H01M 4/0471* (2013.01); *H01M 4/5825* (2013.01); *H01M 10/0525* (2013.01); *H01M 2004/027* (2013.01)

(58) Field of Classification Search
CPC ...... H01M 4/04; H01M 4/483; H01M 4/0471; H01M 4/5825; H01M 10/0525
See application file for complete search history.

(56) References Cited

U.S. PATENT DOCUMENTS 9,929,399 B2 3/2018 Hirose et al.
10,950,852 B2 3/2021 Hayashida et al.
(Continued)

FOREIGN PATENT DOCUMENTS

CN 103840136 A 6/2014
CN 107437614 A 12/2017
(Continued)

OTHER PUBLICATIONS

Machine Translation of: CN 111180693 A, Li et al., May 19, 2020.*
(Continued)

*Primary Examiner* — Kenneth J Douyette
(74) *Attorney, Agent, or Firm* — The Webb Law Firm

(57) ABSTRACT

Provided are a negative electrode active material which includes a negative electrode active material particles which includes a silicon oxide ($SiO_x$, $0 < x \leq 2$); and at least one lithium silicate selected from $Li_2SiO_3$, $Li_2Si_2O_5$, and $Li_4SiO_4$ in at least a part of the silicon oxide. The negative electrode active material has a content of a nitrogen element according to X-ray photoelectron spectroscopy (XPS) of 1.45 atom % or less. Also provided are a negative electrode and a lithium secondary battery including the same.

8 Claims, 1 Drawing Sheet

(51) Int. Cl.
*H01M 4/58* (2010.01)
*H01M 10/0525* (2010.01)
*H01M 4/02* (2006.01)

(56) References Cited

U.S. PATENT DOCUMENTS

| | | | |
|---|---|---|---|
| 2014/0183406 | A1 | 7/2014 | Ide et al. |
| 2014/0322606 | A1 | 10/2014 | Lee et al. |
| 2014/0363741 | A1 | 12/2014 | Lee et al. |
| 2017/0346080 | A1 | 11/2017 | Kano et al. |
| 2018/0257942 | A1* | 9/2018 | Takeshita ............... H01B 1/04 |
| 2019/0006661 | A1 | 1/2019 | Matsuno et al. |
| 2019/0214637 | A1 | 7/2019 | Hirose et al. |
| 2019/0305298 | A1 | 10/2019 | Chae et al. |
| 2019/0305305 | A1 | 10/2019 | Ohsawa et al. |
| 2019/0319261 | A1* | 10/2019 | Uchiyama ............ H01M 4/364 |
| 2020/0075989 | A1 | 3/2020 | Kang et al. |
| 2020/0112019 | A1* | 4/2020 | Oh ....................... H01M 4/133 |

FOREIGN PATENT DOCUMENTS

| | | |
|---|---|---|
| CN | 108321368 A | 7/2018 |
| CN | 108463910 A | 8/2018 |
| CN | 108701825 A | 10/2018 |
| CN | 111180692 A | 5/2020 |
| CN | 111180693 A | 5/2020 |
| JP | 2012209032 A | 10/2012 |
| JP | 2013161705 A | 8/2013 |
| JP | 5549982 B2 | 7/2014 |
| JP | 2015111547 A | 6/2015 |
| JP | 2019175654 A | 10/2019 |
| KR | 1020130098928 A | 9/2013 |
| KR | 1020140070482 A | 6/2014 |
| KR | 1020180124723 A | 11/2018 |
| KR | 1020180127044 A | 11/2018 |
| WO | 2018179970 A1 | 10/2018 |

OTHER PUBLICATIONS

"Li4SiO4-coated LiNi0.5Mn1.5O4 as the high performance cathode materials for lithium-ion batteries", Yang et al., Frontiers in Energy, 11(3), 374-382, Aug. 19, 2017.*

Han et al., "Systematic Investigation of Prelithiated SiO2 Particles for High-Performance Anodes in Lithium-Ion Battery", Appl. Sci., 2018, pp. 1-9, vol. 8, 1245, www.mdpi.com/journal/applsci.

Lee et al., "Effects of Li-Sources on Microstructure of Metallurgically Pre-Lithiated SiOx for Li-Ion Battery's Anode", J. Korean Inst. Electr. Electron. Mater. Eng., Jan. 2019, pp. 75-85, vol. 32 No. 1, Korea.

* cited by examiner

LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

CROSS-REFERENCE TO RELATED APPLICATION

This application claims priority to Korean Patent Application No. 10-2020-0094454 filed Jul. 29, 2020, the disclosure of which is hereby incorporated by reference in its entirety.

BACKGROUND OF THE INVENTION

Field of the Invention

The following disclosure relates to a lithium-doped silicon-based oxide negative electrode active material, a method of preparing the same, and a negative electrode and a lithium secondary battery including the same.

Description of Related Art

As an issue of global warming which is a problem in modern society arises, a demand for environmentally friendly technologies is rapidly increasing in response thereto. In particular, as a technical demand for electric vehicles and energy storage systems (ESS) increases, a demand for a lithium secondary battery in the spotlight as an energy storage device is exploding. Therefore, studies to improve energy density of the lithium secondary battery are in progress.

However, since previously commercialized batteries have a low energy density due to a low theoretical capacity of graphite (372 mAh/g) which is a negative electrode material, studies for developing a new negative electrode material to improve energy density are being conducted.

As a solution thereto, a Si-based material having a high theoretical capacity (3580 mAh/g) is emerging as one solution. However, the Si-based material as such has a disadvantage of a deteriorated life characteristic due to large volume expansion (~400%) in the course of repeated charge and discharge. Thus, as a method of solving the issue of large volume expansion of the Si material, a $SiO_x$ material which has a low volume expansion rate as compared with Si has been developed. Though $SiO_x$ material shows an excellent life characteristic due to the low volume expansion rate, it is difficult to apply the $SiO_x$ material to a lithium secondary battery in practice due to the unique low initial coulombic efficiency (ICE) by initial formation of an irreversible phase.

SUMMARY OF THE INVENTION

An embodiment of the present invention is directed to implementing an excellent initial efficiency characteristic as compared with a conventional $SiO_x$-based material by doping lithium beforehand as a negative electrode active material of a $SiO_x$-based material of a lithium secondary battery.

Specifically, an embodiment of the present invention is directed to suppressing formation of an irreversible phase during initial charge and discharge in production of a negative electrode by doping lithium beforehand by a heat treatment process using a mixture of a lithium source and $SiO_x$ for developing $SiO_x$ having high initial efficiency.

More specifically, an embodiment of the present invention is directed to suppressing formation of a nitrogen compound of an irreversible phase as much as possible by creating an inert atmosphere under specific conditions by the heat treatment process.

Thus, it is intended to develop a high-efficiency $SiO_x$ material, thereby implementing a lithium secondary battery system having a high energy density.

In one general aspect, a negative electrode active material includes: negative electrode active material particles including: a silicon oxide ($SiO_x$, $0<x\leq 2$); and at least one lithium silicate selected from $Li_2SiO_3$, $Li_2Si_2O_5$, and $Li_4SiO_4$ in at least a part of the silicon oxide, wherein the negative electrode active material has a content of a nitrogen element according to X-ray photoelectron spectroscopy (XPS) of 1.45 atom % or less.

The nitrogen element may be from at least one nitrogen compound selected from the group consisting of $Li_2NH$, $LiNH_2$, $LiNO_3$, $Li_3N$, $NSiO_2$, $NSi_2O$, and $Si_3N_4$.

The negative electrode active material particles may include 40 to 85 wt % of the lithium silicate with respect to a total weight.

The negative electrode active material particles may include less than 35 wt % of $Li_4SiO_4$ with respect to the total weight.

In another general aspect, a method of preparing a negative electrode active material includes: performing a purge with an argon gas having a purity of 99.90% or more to create an inert atmosphere, and mixing a silicon oxide and a lithium precursor and performing heat treatment to prepare negative electrode active material particles including: a silicon oxide ($SiO_x$, $0<x\leq 2$) and at least one lithium silicate selected from $Li_2SiO_3$, $Li_2Si_2O_5$, and $Li_4SiO_4$ in at least a part of the silicon oxide.

The purge may be performed at an argon gas flow velocity of 0.05 to 0.15 L/min.

The purge may be performed for a purge time of 20 to 40 minutes.

In another general aspect, a negative electrode includes: a negative electrode active material layer including the negative electrode active material and a water-based binder.

In still another general aspect, a lithium secondary battery includes: the negative electrode; a positive electrode; a separator positioned between the negative electrode and the positive electrode; and an electrolyte.

Other features and aspects will be apparent from the following detailed description, the drawings, and the claims.

DESCRIPTION OF THE INVENTION

Figure 1:
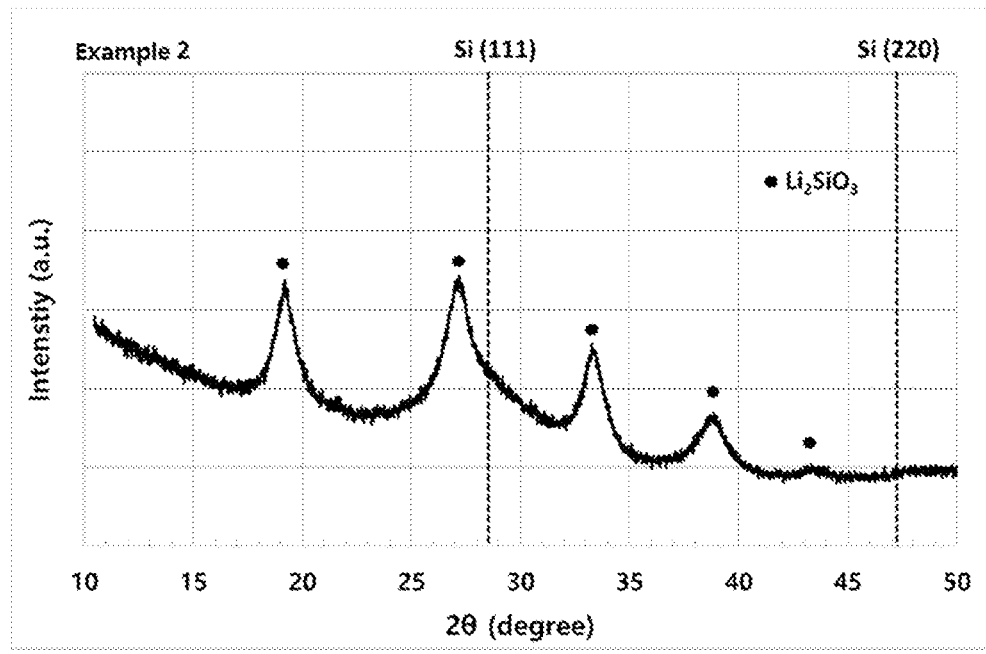
FIG. 1 is a graph showing X-ray diffraction (XRD) analysis results for a negative electrode active material prepared in Example 2.

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

A negative electrode active material according to an embodiment of the present invention is provided. The negative electrode active material includes: negative electrode active material particles including: a silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide, wherein the negative electrode active material has a content of a nitrogen element according to X-ray photoelectron spectroscopy (XPS) of 1.45 atom % or less.

Since the negative electrode active material includes the negative electrode active material particles including a silicon oxide, a battery capacity may be improved, and initial formation of an irreversible phase of the silicon oxide during initial charge and discharge may be suppressed by the lithium silicate.

In the present invention, a lithiation pretreatment process including mixing silicon oxide particles and a lithium precursor and then performing heat treatment under certain conditions under an inert atmosphere is performed to prepare negative electrode active material particles, as described above. Conventionally, the inside of a reaction part was purged under a nitrogen atmosphere to create an inert atmosphere and then a mixture of silicon oxide particles and a lithium precursor was heat-treated, but it was confirmed that a small amount of a nitrogen compound which is in an irreversible phase other than a lithium silicate phase was formed on the prepared negative electrode active material particles. Since nitrogen compound is formed competitively with the lithium silicate, the reduction of an irreversible portion of the initial negative electrode active material is interrupted and energy density may be decreased.

Though in order to suppress formation of the nitrogen compound, the inert atmosphere was created by purging the inside of the reaction part with a low-purity (less than 99.90 vol %) argon gas for replacing a nitrogen gas, a trace amount of the nitrogen compound is still produced, so that initial efficiency, a life characteristic, and a high-energy density were not able to be obtained to a desired level. That is, when impurities are present in a low-purity argon gas to be used in a purge, a purge time or a purge gas flow velocity is not appropriate, and thus, when replacement with inert gas is not sufficient, nitrogen in the air may remain. This may result in producing a trace amount of the nitrogen compound still in a final material in lithium pretreatment (heat treatment). This is not preferred, since it may cause reduction of electrochemical characteristics of the material, as described above.

Therefore, in the present invention, the kind and the purity of a purge gas are adjusted and inert atmosphere conditions of the reaction part, such as, a purge time and a purge gas flow velocity, are strictly controlled, whereby the nitrogen compound is not formed, or even though it is formed, the amount is limited to a very small amount to achieve initial efficiency and a life characteristic to a desired level. In addition, when the initial efficiency is improved simultaneously with an increase in a charge capacity of a negative electrode, use of a positive electrode may be reduced to obtain an effect of improvement of energy density per volume and weight and cost reduction, and thus, it is possible to implement higher energy density per weight as compared with the conventional art.

The negative electrode active material according to an embodiment of the present invention, which has a content of a nitrogen element according to X-ray photoelectron spectroscopy (XPS) of 1.45 atom % or less, may decrease occurrence of an irreversible portion of a lithium ion during initial charge and discharge of a silicon-based negative electrode active material by prelithiation and suppress production of a nitrogen compound thereby improving initial charge and discharge efficiency and a cycle life of a battery.

The negative electrode active material may include 1.43 atom % or less, preferably 1.0 atom % or less, or 0.5 atom % or less, more preferably 0.3 atom % or less, 0.2 atom % or less, or 0.1 atom % or less of a nitrogen element, and most preferably, may include substantially no nitrogen element. Here, including substantially no nitrogen element means a content of a nitrogen element according to XPS of less than 0.1 atom %, specifically 0.08 atom % or less. According to an embodiment of the present invention, a lithium silicate phase may be formed to a desired content level, and simultaneously, production of a nitrogen compound which is formed competitively therewith may be suppressed to the range described above as much as possible.

Meanwhile, the nitrogen element may be from a nitrogen compound which is in an irreversible phase produced in a small amount in lithium pretreatment of a silicon oxide, or may be from nitrogen compound containing at least one element selected from the group consisting of Li, Si, O and H. Specifically the nitrogen element may be from a nitrogen compound containing Li, a nitrogen compound containing Si, a nitrogen compound containing Li and Si, or a combination thereof. More Specifically the nitrogen element may be from at least one nitrogen compound selected from the group consisting of $Li_2NH$, $LiNH_2$, $LiNO_3$, $Li_3N$, $NSiO_2$, $NSi_2O$, and $Si_3N_4$. In addition, the nitrogen compound may be unevenly distributed inside the silicon oxide ($SiO_x$, $0<x\leq2$) particles and/or on the surface of the particles.

A change in a peak according to an X-ray diffraction analysis method (XRD peak) due to production of the nitrogen compound is not large, and since a trace amount of the nitrogen compound is formed and crystallization does not occur, it is difficult to confirm the change. It is not easy with general analysis to confirm whether the nitrogen compound is produced, and it may be confirmed by precision analysis through an X-ray photoelectron analysis method (XPS).

The negative electrode active material particles may include 40 to 85 wt % of the lithium silicate with respect to the total weight, and specifically it is preferred to include 50 to 85 wt %, preferably 70 to 85 wt %, and more preferably 75 to 85 wt % of the lithium silicate. When the lithium silicate is included at less than 40 wt %, an effect of improving initial efficiency obtained by lithium pretreatment beforehand is not sufficient, and when included at more than 85 wt %, the capacity may be decreased due to excessive formation of the irreversible phase. Meanwhile, it is important to suppress production of the nitrogen compound competitively formed therewith as much as possible for forming a lithium silicate phase to a desired content level.

Meanwhile, the lithium silicate may be present inside and/or the surface of the silicon oxide ($SiO_x$, $0<x\leq2$) particles. The lithium silicate may include at least one phase selected from the group consisting of $Li_2SiO_3$, $Li_4SiO_4$, and $Li_2Si_2O_5$, and preferably, include substantially no $Li_4SiO_4$.

A smaller amount of Si is consumed in forming a phase of $Li_2SiO_3$ than in forming a phase of the lithium silicate such as $Li_2Si_2O_5$, whereby capacity characteristics may be improved and a severe volume change of Si during cycles is mitigated so that it is advantageous for improvement of a life characteristic. Meanwhile, a $Li_4SiO_4$ phase has a high moisture content and high reactivity so that it is difficult to adjust the physical properties of slurry in the manufacture of an electrode, which is thus, not preferred. Specifically, the $Li_4SiO_4$ phase has an irreversible characteristic to a Li ion and is vulnerable to moisture so that it is difficult to apply a negative electrode using a water-based binder. For preparing a stable slurry, the content of $Li_4SiO_4$ may be 10 wt % or less, for example, 5 wt % or less, preferably 3 wt % or less, and more preferably less than 1 wt %, with respect to the total weight of the negative electrode active material particles. It is preferred that the content of $Li_4SiO_4$ is within the above range in terms of improvement of water resistance of a negative electrode slurry.

The negative electrode active material particles may be included at 50 wt % or more, preferably 60 wt % or more or 70 wt % or more, more preferably 80 wt % or more or 90 wt % or more, and as an example, 100 wt % with respect to the total weight of the negative electrode active material. Conventionally, when only silicon oxide particles were used as the negative electrode active material, an excellent life characteristic was not able to be implemented due to electrode volume expansion, and thus, a graphite-based active material or the like which may mitigate contraction/expansion of the silicon oxide-based particles was mixed therein in an amount of more than half and used. Since the Li pretreatment of the silicon oxide particles may suppress production of a crystalline silicon-based oxide (c-Si) and increase a ratio of an amorphous silicon-based oxide (a-Si), the present invention may provide the negative electrode active material by including negative electrode active material particles including the silicon oxide and $Li_2SiO_3$ at a high content. Thus, initial efficiency and a life characteristic may be improved as compared with the conventional technology and, simultaneously, a discharge capacity may be further improved.

The negative electrode active material particles may have an average particle size of more than 2 μm and less than 30 μm, preferably more than 7 μm and less than 10 μm, and within the range, volume expansion of the negative electrode active material particles during intercalation/deintercalation of a Li ion may be decreased to suppress electrode deterioration.

The average particle size of the negative electrode active material particles may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample for the prepared carbonaceous material according to a KS A ISO 13320-1 standard and using Mastersizer 3000 from Malvern Panalytical Ltd. Specifically, after particles are dispersed in ethanol as a solvent, if necessary, using an ultrasonic disperser, a volume density may be measured.

In another embodiment of the present invention, a method of preparing the negative electrode active material is provided. The method of preparing a negative electrode active material includes: performing a purge with an argon gas having a purity of 99.90% or more to create an inert atmosphere, and mixing a silicon oxide and a lithium precursor and performing heat treatment to prepare negative electrode active material particles including: a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide.

The purge may be performed at an argon gas flow velocity of 0.05 to 0.5 L/min, preferably 0.05 to 0.2 L/min, and also, may be performed for a purge time of 20 to 40 minutes, preferably 20 to 30 minutes. When initial inert atmosphere is formed in a reaction furnace, the atmosphere is replaced with an argon gas atmosphere by purging, and at this time, in the case in which the atmosphere is not sufficiently replaced with an inert gas or impurities are present in the used inert gas, nitrogen present in the atmosphere or the inert gas is not sufficiently removed. Nitrogen remaining in the reaction furnace may react with a lithium precursor in a lithium pretreatment process which subsequently proceeds, to form the nitrogen compound in at least a part of the negative electrode active material particles.

In the present invention, in order to create an inert atmosphere, an inert argon gas having a purity of 99.90% or more is used, and a sufficient purge time and an argon gas flow velocity are applied, thereby controlling formation of the nitrogen compound to an insignificant extent, and electrochemical properties of a final material may be maximized.

The reaction part (furnace) in which the negative electrode active material particles are prepared is, for example, a vertical type tube with one end being closed, having an outer diameter of 55 mm, an inner diameter of 50 mm, and a length of 500 mm, and a tube having the same volume as the volume when a vertical type tube with both ends being open is applied may be used, but the present invention is not limited thereto. In addition, when a size of the tube is changed, it is preferred to apply the size so that the flow velocity of the purge gas is increased in proportion to the volume.

It may not be preferred that the inert argon gas is replaced or mixed with helium (He), neon (Ne), krypton (Kr), xenon (Xe), or a combination thereof. In particular, a gas reactive to Li and/or Si is not preferred. A $N_2$ gas having a high concentration is reactive to Li even at room temperature, and it is expensive to use helium, neon, krypton, xenon, and the like as a heat transfer medium and may not be appropriate in terms of reactivity with Li and/or Si. Since Ar has an extremely low reactivity with Li and does not react with Li and Si even at a high pressure, it is most appropriate as a heat transfer medium in heat treatment at a high temperature.

Subsequently, the prepared silicon compound particles and the Li precursor are mixed and subjected to heat treatment to prepare negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide.

Specifically, it is preferred that the mixing of the silicon compound particles and the Li precursor is performed so that a Li/Si mole ratio is more than 0.3 and 1.0 or less, specifically more than 0.3 and 0.8 or less, preferably 0.4 to 0.8, more preferably 0.5 to 0.8. Ratios of $Li_2SiO_3$ and $Li_2Si_2O$ in a lithium silicate phase may be increased within the mixing range, and formation of c-Si and a $Li_4SiO_4$ phase may be suppressed.

As the Li precursor, at least one or more selected from LiOH, Li, LiH, $Li_2O$, and $Li_2CO_3$ may be used, and the compound is not particularly limited as long as it may be decomposed during the heat treatment.

Subsequently, the mixture may be heat-treated at higher than 450° C. and 750° C. or less, preferably 500 to 750° C., and more preferably 550 to 750° C. for 1 to 12 hours. When the mixture is heat-treated at a temperature higher than 750° C., a disproportionation reaction may occur or crystal growth of Si is accelerated to cause a side reaction of growing crystalline silicon (c-Si), and when a raw material is prepared at a temperature of 750° C. or lower, it is possible to prepare amorphous or microcrystalline silicon oxide particles. In addition, the heat treatment is performed at a low temperature of 450° C. or less, a lithium pretreatment effect may be rapidly decreased. In addition, as the heat treatment temperature is increased in a preferred temperature range described above, formation of the lithium silicate phase is promoted, but the nitrogen compound may be produced at a high content in proportion thereto. Therefore, in order to form the lithium silicate phase to a desired content level, it is important to strictly adjust purge conditions of a reaction furnace as described above to suppress production of the nitrogen compound as much as possible.

Meanwhile, in the Li pretreatment by an electrochemical method or an oxidation-reduction method, $Li_4SiO_4$ is likely to be produced by lithium silicate, but according to the present invention, a target lithium silicate having a different composition may be synthesized at a high purity by the heat treatment.

Subsequently, the heat treatment product is recovered and pulverized to prepare the negative electrode active material including the final negative electrode active material particles, but the present invention is not limited thereto. Any known pulverization may be applied as the pulverization process, but the present invention is not limited thereto.

Another embodiment provides a negative electrode for a lithium secondary battery including: a current collector; and a negative electrode active material layer including the negative electrode active material and a water-based binder positioned on the current collector.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes the negative electrode active material and the water-based binder, and optionally, may further include a conductive material.

The negative electrode active material includes the negative electrode active material particles including: the silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide, and optionally, may further include a material which may reversibly intercalate/deintercalate a lithium ion, a lithium metal, an alloy of a lithium metal, a material which may be doped or dedoped with lithium, or a transition metal oxide.

The negative electrode active material particles are as described above.

Examples of the material which may reversibly intercalate/deintercalate the lithium ion include a carbon material, that is, a carbon-based negative electrode active material which is commonly used in the lithium secondary battery. Representative examples of the carbon-based negative electrode active material include crystalline carbon, amorphous carbon, or a combination thereof. Examples of the crystalline carbon include graphite such as amorphous, plate-shaped, flake-shaped, spherical, or fibrous natural graphite or artificial graphite, and examples of the amorphous carbon include soft carbon or hard carbon, a mesophase pitch carbide, calcined coke, and the like.

The alloy of the lithium metal may be an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material which may be doped and dedoped with lithium may be a silicon-based material, for example, Si, $SiO_x$ ($0<x\leq2$), a Si-Q alloy (Q is an element selected from the group consisting of alkali metals, alkali earth metals, Group 13 elements, Group 14 elements, Group 15 elements, Group 16 elements, transition metals, rare-earth elements, and combinations thereof, and is not Si), a Si-carbon composite, Sn, $SnO_2$, a Sn—R alloy (R is an element selected from the group consisting of alkali metals, alkali earth metals, Group 13 elements, Group 14 elements, Group 15 elements, Group 16 elements, transition metals, rare-earth elements, and combinations thereof, and is not Si), a Sn-carbon composite, and the like, and also, a mixture of at least one thereof and $SiO_2$ may be used. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

In the negative electrode active material, the negative electrode active material particles may be included at 50 wt % or more, preferably 60 wt % or more or 70 wt % or more, more preferably 80 wt % or more or 90 wt % or more, and as an example, 100 wt % or more with respect to the total weight of the negative electrode active material.

The water-based binder serves to adhere negative electrode active material particles to each other and to attach the negative electrode active material to the current collector well. The water-based binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof, and the like, and specifically, the binder may include a binder formed of carboxymethyl cellulose (CMC), styrene-butadiene rubber (SBR), and a mixture thereof.

The conductive material is used for imparting conductivity to an electrode and any conductive material may be used as long as it is an electroconductive material without causing a chemical change in the battery to be configured. Examples of the conductive material include carbon-based materials such as natural graphite, artificial graphite, carbon black, acetylene black, ketjen black, and carbon fiber; metal-based materials such as metal powder or metal fiber of copper, nickel, aluminum, silver, and the like; conductive polymers such as a polyphenylene derivative; or a mixture thereof.

Each of the contents of the binder and the conductive material in the negative electrode active material layer may be 1 to 10 wt %, preferably 1 to 5 wt % with respect to the total weight of the negative electrode active material layer, but is not limited thereto.

Another embodiment provides a lithium secondary battery includes: the negative electrode; a positive electrode; a separator positioned between the negative electrode and the positive electrode; and an electrolyte.

The negative electrode is as described above.

The positive electrode includes a positive electrode active material layer formed by applying a positive electrode slurry including a positive electrode active material on the current collector.

The current collector may be a negative electrode current collector described above, and any known material in the art may be used, but the present invention is not limited thereto.

The positive electrode active material layer includes the positive electrode active material, and optionally, may further include a binder and a conductive material. The positive electrode active material may be any known positive electrode active material in the art, and for example, it is preferred to use a composite oxide of lithium with a metal selected from cobalt, manganese, nickel, and a combination thereof, but the present invention is not limited thereto.

The binder and the conductive material may be a binder and a negative electrode conductive material described above, and any known material in the art may be used, but the present invention is not limited thereto.

The separator may be selected from glass fiber, polyester, polyethylene, polypropylene, polytetrafluoroethylene, or a combination thereof, and may be in the form of nonwoven or woven fabric. For example, a polyolefin-based polymer separator such as polyethylene or polypropylene may be mainly used in the lithium secondary battery, a separator coated with a composition including a ceramic component or a polymer material for securing thermal resistance or mechanical strength, optionally, a single layer or a multi-layer structure may be used, and any known separator in the art may be used, but the present invention is not limited thereto.

The electrolyte includes an organic solvent and a lithium salt.

The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any known organic solvent in the art may be used, but the present invention is not limited thereto.

The lithium salt is dissolved in the organic solvent and acts as a source of the lithium ion in the battery to allow basic operation of the lithium secondary battery and is a material which promotes movement of lithium ions between a positive electrode and a negative electrode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte has appropriate conductivity and viscosity, so that the electrolyte may exhibit excellent electrolyte performance and lithium ions may effectively move.

In addition, the electrolyte may further include pyridine, triethyl phosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge/discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sulfone (PRS), fluoro-propylene carbonate (FPC), and the like may be further included for improving conservation properties at a high temperature.

The initial charge and discharge efficiency of the lithium secondary battery may be 90% or more, preferably 91% or more, and more preferably 92% or more, the initial charge capacity may be 1,400 (mAh/g) or more, preferably 1,420 (mAh/g) or more, and more preferably 1,450 (mAh/g), and the initial discharge capacity may be 1,260 (mAh/g) or more, preferably 1,290 (mAh/g) or more, and more preferably 1,320 (mAh/g) or more. In addition, 30 cycle life of the lithium secondary battery may be 65% or more, preferably 68% or more, and more preferably 70% or more or 72% or more.

In the present invention, the kind and the purity of purge gas are adjusted and inert atmosphere creation conditions such as a purge time and a purge gas flow velocity are strictly controlled to limit the nitrogen compound to a trace amount whether formed or not, thereby exhibiting an effect of improving initial efficiency simultaneously with an increase of an initial charge/discharge capacity. This is significant in that a disadvantage of conventional technologies in which generally a capacity and efficiency are in a trade-off relationship, when a capacity is improved, initial efficiency is decreased, and when initial efficiency is improved a capacity is decreased may be supplemented to improve all of a charge capacity, a discharge capacity, initial efficiency, and even a life characteristic.

The method of producing a lithium secondary battery according to the present invention for achieving the above object may include laminating the produced negative electrode, separator, and positive electrode in this order to form an electrode assembly, placing the produced electrode assembly in a cylindrical battery case or an angled battery case, and then injecting an electrolyte. Otherwise, the lithium secondary battery may be produced by laminating the electrode assembly and immersing the assembly in the electrolyte to obtain a resultant product which is then placed in a battery case and sealed.

As the battery case used in the present invention, those commonly used in the art may be adopted, there is no limitation in appearance depending on the battery use, and for example, a cylindrical shape, an square shape, a pouch shape, or a coin shape may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the preferred Examples and Comparative Examples of the present invention will be described. However, the following Examples are only a preferred exemplary embodiment of the present invention, and the present invention is not limited thereto.

Examples (Preparation of Silicon Compound Particles)

A raw material in which a silicon metal and silicon dioxide were mixed was introduced to a reaction furnace and evaporated in the atmosphere having a vacuum degree of 10 Pa to obtain a product, which was deposited on a suction plate and sufficiently cooled, and then the deposit was taken out and pulverized with a ball mill to obtain silicon compound particles ($SiO_x$, x=1.0). A particle diameter of the silicon compound particles was adjusted by classification.

The obtained silicon compound particles were subjected to pyrolysis chemical vapor deposition (CVD) to coat a surface of the silicon compound particles with a carbon material, and SiO particles (D50: 8 μm) coated with a carbon material having an average thickness of 100 nm were prepared.

Here, in the preparation of the silicon compound particles, a temperature (heat treatment temperature) of a reaction furnace of 600° C. and a heat treatment time of 1 to 12 hours were applied, and in the coating of the silicon compound particle surface with the carbon material, a reaction furnace temperature of 600° C. and a heat treatment time of 1 to 3 hours were applied.

(Preparation of Negative Electrode Active Material)

The prepared silicon compound particles and LiOH powder were mixed to form mixed powder, the mixed powder and a zirconia ball (1-20 times the mixed powder) were placed in an airtight container, and shaking and mixing were performed for 30 minutes using a shaker. Thereafter, the mixed powder was filtered using a sieve of 25-250 μm and then placed in an aluminum crucible.

The aluminum crucible was heat-treated in a furnace under an inert gas atmosphere for 1-12 hours. Subsequently, the heat-treated powder was recovered and pulverized in a mortar to prepare negative electrode active material particles including a silicon oxide ($SiO_x$) and a lithium silicate (such as $Li_2Si_2O_5$ and $Li_2SiO_3$). 100 wt % of the prepared negative melectrode active material particles were used with respect to the total weight of the negative electrode active material to prepare a negative electrode active material.

Here, a size of the furnace under an inert atmosphere was 55 mm in outer diameter, 50 mm in inner diameter, and 500 mm in length in a vertical type with one end closed.

(Production of Negative Electrode)

The prepared negative electrode active material, a conductive material, carbon black (super P), and a water-based binder (polyacrylic acid) were dispersed at a weight ratio of 8:1:1 in an aqueous solution, applied on a Cu foil, and dried in vacuo at 80-160° C. for 1-24 hours to produce a negative electrode.

(Production of Half Battery)

The produced negative electrode and a lithium metal as a counter electrode were used, a PE separator was interposed between the negative electrode and the counter electrode, and an electrolyte was injected to assembly a coin cell (CR2032). The assembled coin cell was paused at room temperature for 3-24 hours to produce a half battery. Here, the electrolyte was obtained by mixing a lithium salt 1.0 M $LiPF_6$ with an organic solvent (EC:EMC=3:7 vol %) and mixing an electrolyte additive FEC 2 vol %.

Evaluation Example

1. Evaluation of Characteristics of Negative Electrode Active Material Particles (1) XRD Analysis For XRD analysis, an Empyrean XRD diffractometer available from PANalytical was used, and measurement was performed by applying a current of 40 mA with a voltage of 45 kV. Analysis of each phase was performed by comparison with JCPDS card No. 98-002-9287 (Si), 98-002-8192 ($Li_2SiO_3$), 98-028-0481 ($Li_2Si_2O_5$), 98-003-5169 ($Li_4SiO_4$). From the obtained results, peaks of (111) of Si positioned at 28.4±0.3°, (111) of $Li_2Si_2O$ positioned at 24.9±0.3°, and (111) of $Li_2SiO_3$ positioned at 26.9±0.3° were confirmed. The results are shown in FIG. 1.

(2) XPS Measurement

Figure 2:
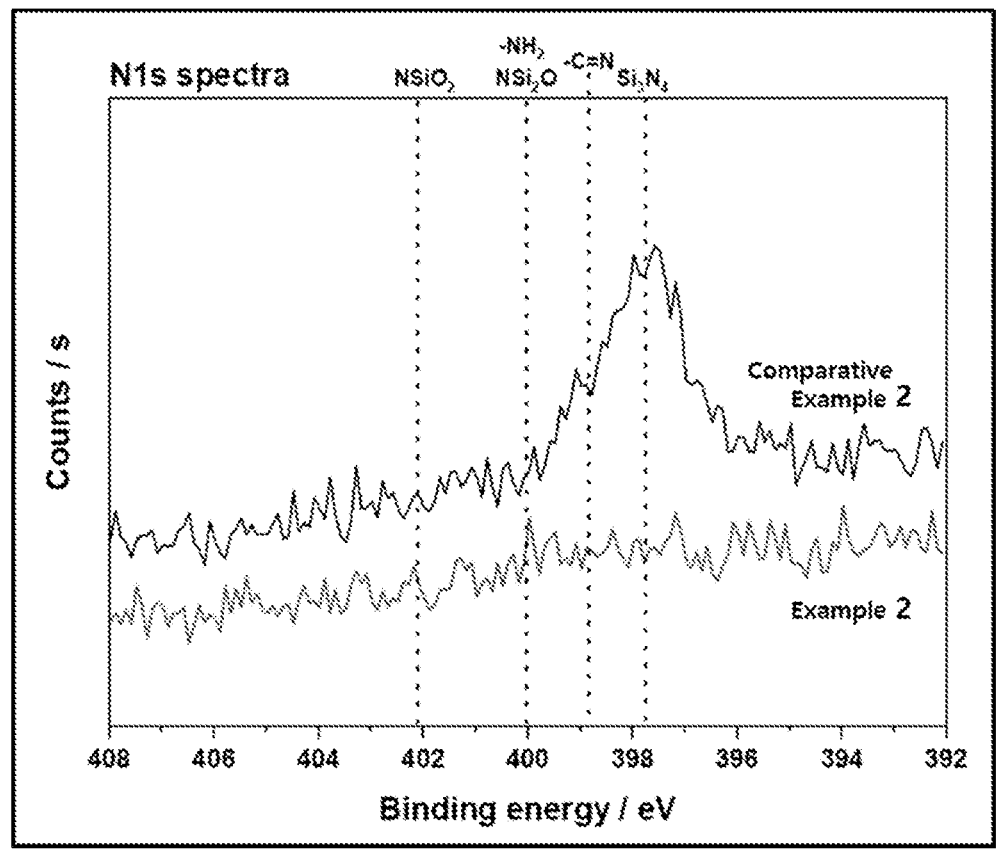
FIG. 2 is a graph showing X-ray photoelectron spectroscopy (XPS) N1s analysis results for negative electrode active materials prepared in Example 2 and Comparative Example 2.

XPS of the prepared negative electrode active material particles was measured. For XPS analysis, ESCALAB 250xi (Thermo Fisher Scientific) was used, the measurement was performed with X-ray (Al k alpha, 1486.68 eV, 650 um Beam size, Analyzer: CAE mode, Number of scans: 5 Narrow Scan, Pass energy: 20 eV), and among them, N1s analysis results are shown in FIG. 2, an area of a signal corresponding to N1s was divided by an integral value of signals corresponding to the total of Li1s, Si2p, Ar2p, C1s, O1s, and N1s to calculate a content to a nitrogen elements, and the results are summarized in the following Tables 1 to 3.

(3) Measurement of Content of Lithium Silicate

For each lithium silicate, an area of each peak was calculated by a Rietveld method and subjected to quantitative analysis. The results are summarized in the following Tables 1 to 3.

2. Evaluation of Electrochemical Properties of Battery

The produced half battery was charged at a constant current at a current of 0.1 C rate at room temperature (25° C.) until a voltage reached 0.01 V (vs. Li), and then was charged at a constant voltage at a voltage of 0.01 V until a current reached 0.01C rate (cut-off current). The battery was discharged at a constant current of 0.1 C rate until the voltage reached 1.5 V (vs. Li). The charge and discharge were set as one cycle, one more cycle of charge and discharge was identically performed, and then 50 cycles in which the applied current was changed to 0.5 C during charge and discharge was performed, with a pause of 10 minutes between the cycles.

An initial charge capacity, an initial discharge capacity, initial efficiency, and a life characteristic as a capacity retention rate (%) which is a discharge capacity for 30 cycles to a discharge capacity for one cycle were measured, and the results are summarized in the following Tables 1 to 3.

Inert atmosphere creation conditions such as a purge gas purity, a purge time, and a purge gas flow velocity; Li pretreatment conditions such as a Li/Si mole ratio and a heat treatment temperature; characteristics of the negative electrode active material particles such as a N element content and a Lithium silicate content; battery characteristics such as a charge capacity, a discharge capacity, initial efficiency, and a cycle life according to Examples 1 to 5, Examples 6 to 10, and Comparative Examples 1 to 8 were summarized and are shown in Tables 1 to 3.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Inert atmosphere conditions | Purge gas purity (vol %) | 99.999 (Ar) | 99.95 (Ar) | 99.90 (Ar) | 99.90 (Ar) | 99.95 (N2) | 99.95 (N2) | 99.95 (N2) |
|  | Purge time (min) | 20 | 20 | 20 | 20 | 20 | 20 | 20 |
|  | Purge gas flow velocity (L/min) | 0.1 | 0.1 | 0.1 | 0.05 | 0.1 | 0.1 | 0.1 |
| Li pretreatment conditions | Li/Si mole ratio | 0.67 | 0.67 | 0.67 | 0.67 | 0.67 | 0.67 | 0.67 |
|  | Heat treatment temperature (° C.) | 750 | 600 | 600 | 600 | 750 | 600 | 450 |
| Characteristics of negative electrode active material particles | Content of N element (at %) | 0.06 | 0.06 | 0.18 | 1.42 | 2.87 | 2.65 | — |
|  | Content of lithium silicate (wt %) | 80 | 82 ($Li_4SiO_4$: 0 wt %) | 78 | 76 | 69 | 68 | — |
| Battery characteristics | Charge capacity (mAh/g) | 1335 | 1461 | 1405 | 1390 | 1250 | 1384 | 1510 |
|  | Discharge capacity (mAh/g) | 1233 | 1354 | 1266 | 1230 | 1094 | 1221 | 1146 |
|  | Initial efficiency (%) | 92.4 | 92.7 | 90.1 | 88.5 | 87.5 | 88.2 | 75.9 |
|  | Cycle life (@30cy, %) | 80.4 | 72.2 | 68.1 | 62.2 | 63.8 | 57.1 | 20.5 |

TABLE 2

|  |  | Comparative Example 4 | Comparative Example 5 | Comparative Example 6 | Comparative Example 7 | Comparative Example 8 | Example 5 |
|---|---|---|---|---|---|---|---|
| Inert atmosphere conditions | Purge gas purity (vol %) | — | 99.90 (Ar) | 99.50 (Ar) | 99.90 (Ar) | 99.95 (Ar) | 99.95 (Ar) |
|  | Purge time (min) | 0 | 5 | 40 | 20 | 20 | 20 |
|  | Purge gas flow velocity (L/min) | — | 0.1 | 0.1 | 0.02 | 0.1 | 0.1 |
| Li pretreatment conditions | Li/Si mole ratio | 0.67 | 0.67 | 0.67 | 0.67 | 0.67 | 0.82 |
|  | Heat treatment temperature (° C.) | 750 | 750 | 750 | 600 | 450 | 600 |
| Characteristics of negative electrode active material particles | Content of N element (at %) | 2.21 | 4 | 1.72 | 1.64 | — | 0.06 |
|  | Content of lithium silicate (wt %) | 66 | 68 | 77 | 72 | — | 71 ($Li_4SiO_4$: 5 wt %) |
| Battery characteristics | Charge capacity (mAh/g) | 1335 | 1315 | 1332 | 1298 | 1575 | 1281 |
|  | Discharge capacity (mAh/g) | 1233 | 1200 | 1235 | 1205 | 1197 | 1154 |
|  | Initial efficiency (%) | 92.4 | 91.3 | 92.7 | 92.8 | 76.0 | 90.1 |
|  | Cycle life (@30cy, %) | 30.8 | 59.1 | 68.2 | 65.3 | 61.4 | 70.5 |

Referring to Tables 1 and 2, in Examples 1 to 4, production of the nitrogen compound during heat treatment was able to be extremely limited by using a high-purity argon gas and applying a sufficient purge time and a purge gas flow velocity, as purge conditions of the reaction furnace. However, it was confirmed that a purge was performed with a nitrogen gas instead of an argon gas in Comparative Examples 1 to 3, a purge was not performed so that nitrogen remained in the reaction furnace in Comparative Example 4, and when a high-purity argon gas was used, but a purge time was not sufficient (Comparative Example 5), an argon gas having a not-high purity was used (Comparative Example 6), or a purge gas flow velocity was somewhat low (Comparative Example 7) also, nitrogen remained in the reaction furnace to produce a nitrogen compound during heat treatment.

In addition, it was analyzed that as a temperature was increased in a heat treatment range of lithium pretreatment of 450 to 750° C., production of a lithium silicate in the negative electrode active material particles was promoted, but a high content of the nitrogen compound was produced in proportion thereto (see Comparative Examples 1 and 2). In Examples 1 and 2, heat treatment for lithium pretreatment was performed in a relatively high temperature range while the lithium silicate was decreased to 80 wt % or more and a nitrogen element content was significantly decreased, thereby improving initial efficiency and cycle life characteristics. In Comparative Examples 3 and 8, it was confirmed that regardless of the conditions of a purge step, when the heat treatment temperature was 450° C. or lower, the lithium pretreatment was not performed at all.

Meanwhile, in Comparative Example 5, it was confirmed that since a Li/Si mole ratio of the lithium precursor and the silicon compound particles was somewhat high, an undesired lithium silicate phase ($Li_4SiO_4$) was partly formed, so that the battery characteristics was somewhat deteriorated as compared with Example 2.

TABLE 3

|  |  | Example 6 | Example 7 | Example 8 | Example 9 | Example 10 |
|---|---|---|---|---|---|---|
| Inert atmosphere conditions | Purge gas purity (vol %) | 99.999 (Ar) | 99.999 (Ar) | 99.999 (Ar) | 99.999 (Ar) | 99.999 (Ar) |
|  | Purge time (min) | 20 | 20 | 20 | 20 | 20 |
|  | Purge gas flow velocity (L/min) | 0.1 | 0.1 | 0.1 | 0.1 | 0.1 |
| Li pretreatment conditions | Li/Si mole ratio | 0.25 | 0.33 | 0.33 | 0.50 | 0.50 |
|  | Heat treatment temperature (° C.) | 750 | 750 | 600 | 750 | 600 |
| Characteristics of negative electrode active material particles | Content of N element (at %) | <0.06 | <0.06 | <0.06 | <0.06 | <0.06 |
|  | Content of lithium silicate (wt %) | 42 | 51 | 51 | 57 | 55 |
| Battery characteristics | Charge capacity (mAh/g) | 1587 | 1483 | 1672 | 1472 | 1535 |
|  | Discharge capacity (mAh/g) | 1321 | 1288 | 1394 | 1321 | 1377 |
|  | Initial efficiency (%) | 83.2 | 86.9 | 83.4 | 89.7 | 89.7 |
|  | Cycle life (@30cy, %) | 58.2 | 72.5 | 56.1 | 76.4 | 70.8 |

Referring to Tables 1 and 3, as the lithium pretreatment was performed under specific conditions in Examples 6 to 10, the content of the lithium silicate formed in the negative electrode active material particles was able to be adjusted. Here, during the lithium pretreatment, when a Li element mole ratio was relatively low (Li/Si mole ratio of 0.25 to 0.50), Si and O in the raw material were not sufficiently reacted, so that a large amount of Si—O which was not Li-pretreated were present in the negative electrode active material particles. Thus, the charge capacity tended to be increased, but a Li$^+$ ion intercalated during initial charge formed an irreversible phase to cause reduction of initial efficiency and derived deterioration of the cycle characteristic of the raw material. Therefore, referring to Examples 1 to 5 of Table 1, specific synthesis conditions for a Li content and a temperature in an appropriate range are needed when the lithium silicate is formed from the raw material during the lithium pretreatment, and the nitrogen compound which is competitively formed with the lithium silicate may be suppressed by excluding a N$_2$ gas atmosphere as much as possible and increasing an Ar gas purity. As a result, the lithium silicate corresponding to the preferred content range of the present invention may be formed, and the production of the nitrogen compound is suppressed to allow synthesis of an active material showing a high capacity, high efficiency, and high life battery characteristics.

An irreversible portion of a silicon-based oxide negative electrode active material may be decreased during initial charge and discharge by performing prelithiation.

Formation of a nitrogen compound which is in an irreversible phase may be suppressed and a cell energy density may be improved by performing prelithiation under an inert atmosphere of certain conditions.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode active material comprising: negative electrode active material particles including a silicon oxide represented by SiO$_x$, where 0<x≤2, and at least one lithium silicate selected from Li$_2$SiO$_3$, Li$_2$Si$_2$O$_5$, and Li$_4$SiO$_4$ in at least a part of the silicon oxide,
    wherein the negative electrode active material has a content of a nitrogen element according to X-ray photoelectron spectroscopy (XPS) of 1.45 atom % or less, and
    wherein the negative electrode active material particles include 70 to 85 wt % of the lithium silicate with respect to a total weight.

2. The negative electrode active material of claim 1, wherein the nitrogen element is from at least one nitrogen compound selected from the group consisting of Li$_2$NH, LiNH$_2$, LiNO$_3$, Li$_3$N, NSiO$_2$, NSi$_2$O, and Si$_3$N$_4$.

3. The negative electrode active material of claim 1, wherein the negative electrode active material particles include more than 0 wt % and 10 wt % or less of Li$_4$SiO$_4$ with respect to the total weight.

4. A negative electrode comprising a negative electrode active material layer comprising: the negative electrode active material of claim 1 and a water-based binder.

5. A lithium secondary battery comprising: the negative electrode of claim 4; a positive electrode; a separator positioned between the negative electrode and the positive electrode; and an electrolyte.

6. A method of preparing the negative electrode active material of claim 1, the method comprising:
    performing a purge with an argon gas having a purity of 99.90% or more to create an inert atmosphere, and
    mixing a silicon oxide and a Li precursor and performing heat treatment to prepare negative electrode active material particles including a silicon oxide represented by SiO$_x$, where 0<x≤2, and at least one lithium silicate selected from Li$_2$SiO$_3$, Li$_2$Si$_2$O$_5$, and Li$_4$SiO$_4$ in at least a part of the silicon oxide.

7. The method of preparing a negative electrode active material of claim 6, wherein the purge is performed at an argon gas flow velocity of 0.05 to 0.5 L/min.

8. The method of preparing a negative electrode active material of claim 6, wherein the purge is performed for a purge time of 20 to 40 minutes.

* * * * *